United States Patent Office 3,007,157
Patented Oct. 31, 1961

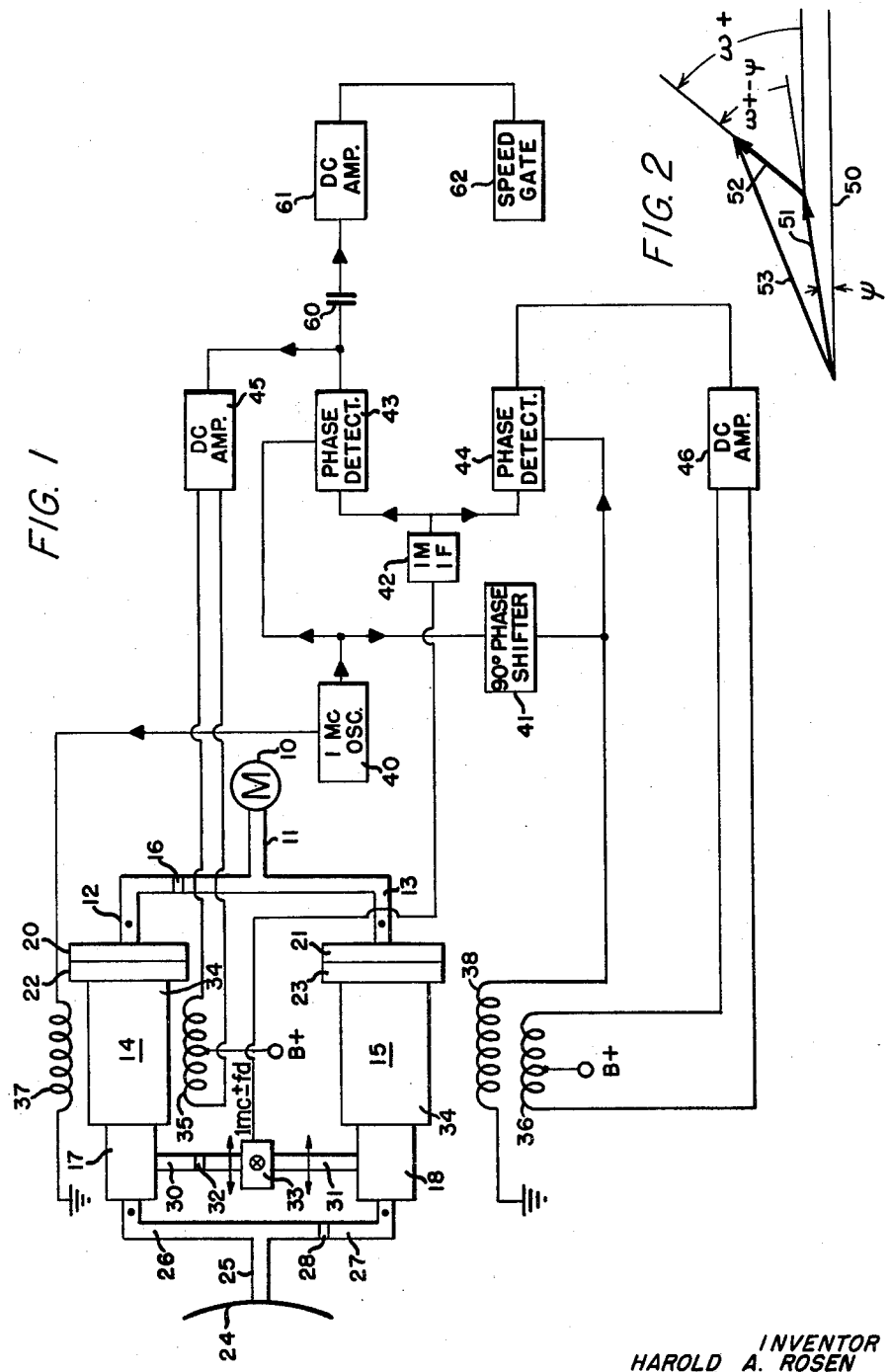

3,007,157
FEED-THROUGH NULLING AND DUPLEXER SYSTEMS
Harold A. Rosen, Santa Monica, Calif., assignor to Raytheon Company, a corporation of Delaware
Filed July 25, 1958, Ser. No. 752,155
7 Claims. (Cl. 343—8)

This invention relates to a feed-through nulling system for a continuous wave (CW) or other Doppler radar using a single antenna in which the nulling system also serves as a duplexer.

In Doppler radars the output signal from the transmitter is a continuous wave of energy which is changed in frequency by reflections from a moving target. This change in frequency is called the Doppler effect and is detected by continuously comparing the frequency of the incoming reflected signal with that of the outgoing transmitted signal. The resulting signal at the difference or Doppler frequency is then fed to a receiver. Since it is necessary for the received frequency to be continuously compared with the transmitted frequency there must of necessity be close coupling between the transmitter and the receiver. This results in a portion of the transmitted energy being fed to the receiver. This energy regardless of how it is coupled to the receiver is what is referred to herein as the feed-through signal. Unfortunately, this feed-through signal results in saturation of the receiver and in degradation of the system sensitivity. This problem is especially severe where the same antenna is used for both transmitting and receiving by means of a duplexer. The result has been that Doppler radars have been limited in available output in order to obtain a proportional reduction in feed-through signal. A form of feed-through nulling has been developed in which two ferrite modulators are arranged as single sideband modulators with an A.C. and a D.C. source of modulating current. In addition, a duplexer is provided to partially isolate the receiver from the transmitter.

By the present invention the same result is accomplished without the need of a separate duplexer by modifying the modulators to utilize them as duplexers by appropriately arranging the polarity in which the transmitted and received energy is applied to the modulators and in which the resultant energy is extracted from the modulators.

The foregoing and other advantages and features of the invention will be better understood from the following description taken in conjunction with the accompanying drawing wherein:

FIG. 1 is a schematic diagram of a system embodying the invention;

FIG. 2 is a vector diagram of the output of the modulators.

In FIG. 1 the reference numeral 10 designates a magnetron or other oscillator connected by waveguide 11 and its branches 12 and 13 to the two modulators 14 and 15, respectively. A delay section 16 is introduced into waveguide 12 to delay the signal propagated in this guide by 45 electrical degrees. The modulators 14 and 15 are best constructed in the manner shown in my copending application Serial No. 748,569, filed July 10, 1958. They are formed of a section of round or square waveguide 17 or 18 capable of propagating the frequencies of interest in any polarity coupled to the branch guide 12 or 13 through a 45° twist plate 20 or 21 and a vector plate 22 or 23 so that the energy from the oscillator 10 is applied to the modulators in a polarity shifted 45° from the vertical. Energy received by an antenna 24 is propagated along waveguide 25 and its branches 26 and 27 to the modulators 14 and 15. A delay section 28 is introduced into waveguide 27 to delay the signal propagated in this guide by 45 electrical degrees. The guide 17 or 18 of the modulator 14 or 15 is coupled to the waveguide 26 or 27 from the antenna 24 in vertical polarity. Energy is extracted from the same end of the modulator 14 or 15 as received energy is introduced by means of a waveguide 30 or 31 arranged with its wide wall parallel to the axis of the guide 17 or 18 of the modulator 14 or 15 so that energy polarized 90° from the received energy is extracted from the modulators. Waveguide 30 has a delay section 32 added to delay the extracted energy 45 electrical degrees with respect to the energy propagated in waveguide 31. The waveguides 30 and 31 feed a detector 33. The 45 electrical degree delays may be obtained by lengthing the waveguide sections carrying the energy to be delayed by an amount equal to an integral odd number of ⅛ wavelength at the operating frequency of the oscillator.

Each of the modulators 14 and 15 has a ferrite insert 34 preferably in the shape of a hollow cylinder. Magnetizing current is applied to this ferrite by means of two sets of coils 35 and 36 and 37 and 38. Coils 35 and 36 are supplied with sufficient direct current so that, in the absence of a signal obtained in a manner to be described, the ferrite pieces 34 are sufficiently magnetized to cause energy propagating therethrough to be rotated in polarities 45° in such a direction that, in the absence of additional control signal, energy from the magnetron 10 goes straight through to the antenna 24 but cannot propagate into the waveguides 30 and 31 feeding the detector 33. Received energy from the antenna propagates down guides 25, 26 and 27 to the modulators 14 and 15 where it is rotated 45° in polarization by the unilateral ferrite members 34 in a sense such that the energy is reflected by the vector plates 22 and 23 back through the ferrites 34 to receive a further rotation of 45° in the same direction to place it in proper polarity to be propagated into the guides 30 and 31 coupled to the detector 33 and cross-polarized with respect to the waveguides 26 and 28. This accomplishes the duplexing effect.

In addition, there is a second oscillator 40 producing energy at a lower frequency, for example, one megacycle, which is applied directly to the coil 37 on modulator 14 and, after being shifted 90° in phase by a phase shifter 41, to coil 38 on modulator 15. This current magnetizes the ferrites 34 to produce a rotation of the plane of polarization of the microwave energy propagating through them in a direction dependent on the direction of the magnetic field caused by the current flow in the coils. The polarization of the radiant energy from the magnetron propagating in the modulator is such that with the normal quiescent current flowing in the coils 35 and 36 (and no signal applied to coils 37 and 38) none of this energy will reach the detector 33 but will pass straight through to the antenna 24. Under these conditions the polarization of the received radiant energy propagating in the modulators will be rotated 45° once, reflected from the vector plates 22 and 23 and rotated again by 45° to put it in proper polarity to be propagated in the receiver guides 30 and 31. When these conditions are changed as by the application of the one megacycle signal from oscillator 40 to coils 37 and 38, the received energy is shifted sufficiently in polarity so that a portion of it goes through the vector plates 22 and 23 or is otherwise diverted from the receiver guides 30 and 31, while the polarization of the magnetron energy is shifted sufficiently so that a portion of this energy is propagated in the receiver guides 30 and 31. The portion of these energies so diverted is proportional to the square of the sin and cos of the angle through which the polarization is shifted at any given instant which is in turn proportional to the current applied to the coils. Thus, the one megacycle signal applied to coils 37 and 38 serves to modulate the energy in the modulators at a frequency of one megacycle per second.

It will be noted that any magnetron energy reaching the receiver crystal 33 through modulator 14 will pass through the two 45 electrical degree delay sections 16 and 32 for a total delay of 90 electrical degrees while the magnetron energy reaching the receiver crystal 33 through modulator 15 will not pass through any such delay sections. Thus, the magnetron energy reaching the receiver crystal along these two paths will arrive in phase quadrature. Received energy reaching the receiver crystal through modulator 14 will pass through delay section 32 and undergo a delay of 45 electrical degrees. Received energy reaching the receiver crystal through modulator 15 will pass through delay section 28 and undergo a delay of 45 electrical degrees. Thus, the received energy reaching the receiver crystal over the two paths will arrive in phase. The modulating current from the oscillator 40 is applied to the two modulators in phase quadrature due to the phase shifter 41.

In the detector 33 the original applied frequencies and the modulation products are mixed in proper phase to produce a single sideband signal displaced from the one megacycle frequency by the Doppler frequency.

FIG. 2 helps to show how the phase and amplitude of this signal are determined. The reference phase is indicated by line 50. The feed-through energy from the magnetron is indicated by the arrow 51 at an angle $\psi$ reperesenting the phase of this energy. The pilot signal is represented by the arrow 52 at an angle $\omega t$ to the reference representing its phase and at an angle $\omega t - \psi$ to the feed-through energy. The single sideband frequency modulated generated in the modulator is indicated by the arrow 53. The envelope of this modulated wave (which is the signal accepted by the I.F. amplifier 42) has a phase angle determined by the phase of the feed-through signal and an amplitude determined by the smaller of the feed-through and pilot signals.

This signal is amplified in the I.F. amplifier 42 and applied to phase detectors 43 and 44 together with the output of the oscillator 40. These phase detectors may be of the type illustrated in FIG. 35–V and described on page 322, paragraph 30 of "The Electronic Control Handbook" by Batcher and Moulic. The output of the phase detector 43 is amplified by integrating D.C. amplifier 45 and the resulting D.C. signal applied to coil 35 of the ferrite modulator 14. The output of phase detector 44 is amplified by integrating D.C. amplifier 46 and the output applied to coil 36 of the modulator 15. When the two signals applied to either of the phase detectors are out of phase in one direction, current flows in one section of the respective coil 35 or 36, producing a rotation of polarization in one direction in the modulators, and when they are out of phase in the other direction, current flows in the other section of the respective coil in the opposite direction. In effect, the phase detectors produce an error signal and the D.C. windings on the modulators close a servo loop.

The output of the phase detector 43 also contains a signal proportional to the Doppler frequency and is coupled through capacitor 60 and Doppler amplifier 61 to the speed gate 62 to give the desired output signal. The time constants of the system are selected so that the lowest Doppler frequencies of interest are not inordinately degenerated.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a Doppler radar system a first source of radiant energy, means for propagating and receiving such energy, a pair of modulators comprising ferrite microwave gyrators adapted to normally produce a 45° rotation in the polarization of energy passing through them, means to apply the output energy from said first source to said modulators in like polarity and in phases differing by 45 electrical degrees, means to apply received energy to said modulators in a polarity shifted 45° from that of the energy from the first source and in phases differing by 45 electrical degrees in the opposite sense to that in which the energy from the first source is applied, means to extract radiant energy from said modulators differing in polarity by 90° from that of the received energy, and in phase by 45 electrical degrees, a second source of radiant energy at a second frequency, means to apply the output of said second radiant energy source to the modulator, means to compare the phase of the output of said second source with that of the output of the modulators at a frequency differing from that of the second source by the same amount that the received energy differs from that of the transmitted energy, means to compare the phase of the output of the modulators at such frequency with that of the output of the second source shifted 90° in phase, and means to apply the output of each phase comparison means to a respective modulator to obtain a signal determined by the difference in frequency of the transmitted and received signals without excessive energy at the transmitted frequency.

2. In a Doppler radar system a first source of radiant energy, means for propagating and receiving such energy, a pair of modulators comprising ferrite microwave gyrators adapted to normally product a 45° rotation in the polarization of energy passing through them, means comprising two sections of waveguide differing in length by one eighth of a wavelength at the operating frequency to apply the output energy from said first source to said modulators in one polarity and in phases differing by 45 electrical degrees, means to apply received energy to said modulators in a polarity shifted 45° from that of the energy from the first source and in phases differing by 45 electrical degrees in the opposite sense to that in which the energy from the first source is applied, means to extract radiant energy from said modulators differing in polarity by 90° from that of the received energy and in phase by 45 electrical degrees, a second source of radiant energy at a second frequency, means to apply the output of said second radiant energy source to the modulators, means to compare the phase of the output of said second source with that of the output of the modulators at a frequency differing from that of the second source by the same amount that the received energy differs from that of the transmitted energy, means to compare the phase of the output of the modulators at such frequency with that of the output of the second source shifted 90° in phase, and means to apply the output of each phase comparison means to a respective modulator to obtain a signal determined by the difference in frequency of the transmitted and received signals without excessive energy at the transmitted frequency.

3. In a Doppler radar system a first source of radiant energy, means for propagating and receiving such energy, a pair of modulators comprising ferrite microwave gyrators adapted to normally produce a 45° rotation in the polarization of energy passing through them, means to apply the output energy from said first source to said modulators in one polarity and in phases differing by 45 electrical degrees, means to apply received energy to said modulators in a polarity shifted 45° from that of the energy from the the first source and in phases differing by 45 electrical degrees in the opposite sense to that in which the energy from the first source is applied comprising two sections of waveguide differing in length by one eighth of a waveguide at the operating frequency, means to extract radiant energy from said modulators differing in polarity by 90° from that of the received energy and in phase by 45 electrical degrees, a second source of radiant energy at a second frequency, means to apply the output of said second radiant energy source to the modulators, means to compare the phase of the output of said second source with that of the output of the modulators at a frequency differing from that of the second source by the same amount that the received energy differs from that of the transmitted energy, means to compare the phase of the output of the modulators at such frequency with that of the output of the second source shifted 90° in phase, and means to apply the output of each phase comparison means to a respective modulator to otain a signal determined by the difference in frequency of the transmitted and received signals without excessive energy at the transmitted frequency.

4. In a Doppler radar system a first source of radiant energy, means for propagating and receiving such energy, a pair of modulators comprising ferrite microwave gyrators adapted to normally produce a 45° rotation in the polarization of energy passing through them, means to apply the output energy from said first source to said modulators in one polarity and in phases differing by 45 electrical degrees, means to apply received energy to said modulators in a polarity shifted 45° from that of the energy from the first source and in phases differing by 45 electrical degrees in the opposite sense to that in which the energy from the first source is applied, means to extract radiant energy from said modulators differing in polarity by 90° from that of the received energy and in phase by 45 electrical degrees comprising two sections of waveguide differing in length by one eighth of a wavelength at the operating frequency, a second source of radiant energy at a second frequency, means to apply the output of said second radiant energy source to the modulators, means to compare the phase of the output of said second source with that of the output of the modulators at a frequency differing from that of the second source by the same amount that the received energy differs from that of the transmitted energy, means to compare the phase of the output of the modulators at such frequency with that of the output of the second source shifted 90° in phase, and means to apply the output of each phase comparison means to a respective modulator to obtain a signal determined by the difference in frequency of the transmitted and received signals without excessive energy at the transmitted frequency.

5. In a Doppler radar system a first source of radiant energy, means for propagating and receiving such energy, a pair of modulators comprising ferrite microwave gyrators adapted to normally produce a 45° rotation in the polarization of energy passing through them, means to apply the output energy from said first source to said modulators in one polarity and in phases differing by 45 electrical degrees, means to apply received energy to said modulators in a polarity shifted 45° from that of the energy from the first source and in phase differing by 45 electrical degrees in the opposite sense to that in which the energy from the first source is applied, means to extract radiant energy from said modulators differing in polarity by 90° from that of the received energy and in phase by 45 electrical degrees, a second source of radiant energy at a second frequency, coil means to apply the output of said second radiant energy source to the modulators, means to compare the phase of the output of said second source with that of the output of the modulators at a frequency differing from that of the second source by the same amount that the received energy differs from that of the transmitted energy, means to compare the phase of the. output of the modulators at such frequency with that of the output of the second source shifted 90° in phase, and means to apply the output of each phase comparison means to a respective modulator to obtain a signal determined by the difference in frequency of the transmitted and received signals without excessive energy at the transmitted frequency.

6. In a Doppler radar system a first source of radiant energy, means for propagating and receiving such energy, a pair of modulators comprising ferrite microwave gyrators adapted to normally produce a 45° rotation in the polarization of energy passing through them, means to apply the output energy from said first source to said modulators in one polarity and in phases differing by 45 electrical degrees, means to apply received energy to said modulators in a polarity shifted 45° from that of the energy from the first source and in phases differing by 45 electrical degrees in the opposite sense to that in which the energy from the first source is applied, means to extract radiant energy from said modulators differing in polarity by 90° from that of the received energy and in phase by 45 electrical degrees, a second source of radiant energy at a second frequency, means to apply the output of said second radiant energy source to the modulators, means to compare the phase of the output of said second source with that of the output of the modulators at a frequency differing from that of the second source by the same amount that the received energy differs from that of the transmitted energy, means to compare the phase of the output of the modulators at such frequency with that of the output of the second source shifted 90° in phase, and coil means to apply the output of each phase comparison means to a respective modulator to obtain a signal determined by the difference in frequency of the transmitted and received signals without excessive energy at the transmitted frequency.

7. In a Doppler radar system a first source of radiant energy, means for propagating and receiving such energy, a pair of modulators comprising ferrite microwave gyrators adapted to normally produce a 45° rotation in the polarization of energy passing through them, means comprising two sections of waveguide differing in length by one-eighth of a wavelength at the operating frequency to apply the output energy from said first source to said modulators in one polarity and in phases differing by 45 electrical degrees, means to apply received energy to said modulators in a polarity shifted 45° from that of the energy from the first source and in phases differing by 45 electrical degrees in the opposite sense to that in which the energy from the first source is applied comprising two sections of waveguide differing in length by one eighth of a wavelength at the operating frequency, means to extract radiant energy from said modulators differing in polarity by 90° from that of the received energy and in phase by 45 electrical degrees comprising two sections of waveguide differing in length by one eighth of a wavelength at the operating frequency, a second source of radiant energy at a second frequency, coil means to apply the output of said second radiant energy source to the modulators, means to compare the phase of the output of said second source with that of the output of the modulators at a frequency differing from that of the second source by the same amount that the received energy differs from that of the transmitted energy, means to compare the phase of the output of the modulators at such frequency with that of the output of the second source shifted 90° in phase, and coil means to apply the output of each phase comparison means to a respective modulator to obtain a signal determined by the difference in frequency of the transmitted and received signals without excessive energy at the transmitted frequency.

No references cited.

UNITED STATES PATENT OFFICE
CERTIFICATION OF CORRECTION

Patent No. 3,007,157                            October 31, 1961

Harold A. Rosen

It is hereby certified that error appears in the above numbered patent requiring correction and that the said Letters Patent should read as corrected below.

Column 2, lines 13 and 14, for "lengthing" read -- lengthening --; column 3, line 31, after "modulated" insert -- wave --; column 4, line 28, for "product" read -- produce --.

Signed and sealed this 24th day of April 1962.

(SEAL)
Attest:

ESTON G. JOHNSON                                   DAVID L. LADD
Attesting Officer                                        Commissioner of Patents

UNITED STATES PATENT OFFICE
CERTIFICATION OF CORRECTION

Patent No. 3,007,157                        October 31, 1961

Harold A. Rosen

It is hereby certified that error appears in the above numbered patent requiring correction and that the said Letters Patent should read as corrected below.

Column 2, lines 13 and 14, for "lengthing" read -- lengthening --; column 3, line 31, after "modulated" insert -- wave --; column 4, line 28, for "product" read -- produce --.

Signed and sealed this 24th day of April 1962.

(SEAL)
Attest:

ESTON G. JOHNSON
Attesting Officer

DAVID L. LADD
Commissioner of Patents